United States Patent [19]

Slaugh

[11] Patent Number: 4,669,545

[45] Date of Patent: Jun. 2, 1987

[54] WELL ACIDIZATION WITH ALPHA-HYDROXYSULFONIC ACID

[75] Inventor: Lynn H. Slaugh, Cypress, Tex.

[73] Assignee: Shell Oil Company, Houston, Tex.

[21] Appl. No.: 867,171

[22] Filed: May 27, 1986

[51] Int. Cl.$^4$ .............................................. E21B 43/27
[52] U.S. Cl. ................................... 166/300; 166/307; 252/8.553
[58] Field of Search ............... 166/250, 300, 304, 307, 166/270, 271; 252/8.55 C, 8.553

[56] References Cited

U.S. PATENT DOCUMENTS

| | | | |
|---|---|---|---|
| 2,175,081 | 10/1939 | Grebe | 252/8.55 C |
| 3,302,711 | 2/1967 | Dilgren | 166/270 |
| 3,326,289 | 6/1967 | Mulder | 166/270 X |
| 3,353,597 | 11/1967 | Mulder | 166/270 |
| 3,398,791 | 8/1968 | Hurd | 166/270 |
| 3,532,165 | 10/1970 | Raifsnider | 166/270 |
| 3,889,753 | 6/1975 | Richardson | 166/300 X |
| 4,136,739 | 1/1979 | Salathiel et al. | 166/300 |
| 4,589,488 | 5/1986 | Schirmer | 166/270 |

*Primary Examiner*—George A. Suchfield

[57] ABSTRACT

In acidizing a well, fluid inclusive of at least one carbonyl compound, an aqueous liquid and at least one material which contains or forms sulfite ions in the aqueous liquid is injected to form at least one alpha-hydroxysulfonic acid in contact with acidifiable material in and around the well.

7 Claims, No Drawings

WELL ACIDIZATION WITH ALPHA-HYDROXYSULFONIC ACID

BACKGROUND OF THE INVENTION

This invention relates to a well treating process for reacting acid-reactive material in and around a well within a subterranean reservoir formation with at least one alpha-hydroxysulfonic acid. More particularly, the invention relates to a well acidizing process in which the rate of reaction of an aqueous strong acid can be retarded enough to allow relatively deep penetration into a reservoir formation containing acid-reactive material.

Numerous methods and compositions have been proposed for reducing the rate of acidization reactions with aqueous solutions of strong acids such as hydrochloric acid or mixtures of hydrochloric and hydrofluoric acids. The prior proposals have included: dissolving or emulsifying an acid or acid-forming material in a nonaqeous liquid; forming an acid within a water-containing remote location, such as a subterranean reservoir, by means of a relatively slow hydrolysis of an organic halide or ester; dissolving a water-thickening material in an acid to reduce the rate at which the acidic component can diffuse into contact with acid-reacting material; and the like.

For example, U.S. Pat. No. 3,889,753 by E. A. Richardson suggests acidizing silicious material by contacting it with an aqueous solution of a fluoride salt, a weak acid, and a weak acid salt in proportions which maintain a significant but low concentration of hydrogen fluoride in the solution. U.S. Pat. No. 4,122,896 by R. F. Scheuermann, E. A. Richardson and C. C. Templeton, suggests acidizing a carbonate reservoir by injecting an aqueous solution of a chlorocarboxylic acid salt so that the rate of acidization is limited to the rate at which an acid is formed by the hydrolyzing of the chlorocarboxylate ions. The disclosures of those patents relative to utilizations of aqueous strong acid solutions having relatively slow rates of reaction are incorporated herein by reference.

Numerous reactions of aqueous solutions containing a sulfite and aldehyde are known. For example, in U.S. Pat. No. 4,508,171, an aqueous alkaline solution containing a sulfite and an aldehyde are injected into an oil containing subterranean reservoir to react in situ with the oil to form a surfactant for aiding the displacement of the oil toward a production location. U.S. Pat. No. 4,395,356 by L. H. Slaugh and C. L. Willis relates to removing catalyst residues from a polybutene polymer dissolved in a hydrocarbon solvent by contacting the solution with an aqueous solution of an alpha-hydroxysulfonic acid prepared by reacting a carbonyl compound with sulfur dioxide and water. U.S. Pat. No. 4,396,761 by C. L. Willis and L. H. Slaugh relates to removing hydrogenation catalyst residues from conjugated-diene polymers by contacting solutions of them with a similarly prepared alpha-hydroxysulfonic acid. An acidulation process for treating phosphate rock described in Chem and Engineering News, Sept. 6, 1976, involves reacting the rock at room temperature with a mixture of acetone, sulfur dioxide and water in a manner causing the phosphorous to dissolve (mainly in the form of dicalcium phosphate) for recovery as a filtrate while leaving a filter cake containing calcium alpha-hydroxy-2-propane sulfonate from which sulfur dioxide and acetone can be recovered by heating.

In such extracting and acidulating processes the use of the hydroxysulfonic acid prepared by the in situ reaction between $SO_2$ water and a carbonyl compound is advantageous because such reactants form a solution in which, even at ambient temperatures, the water, $SO_2$ and the carbonyl compound quickly form an equilibrium between them and an alpha-hydroxysulfonic acid. The reaction is one in which an increase in temperature shifts equilibrium by increasing the proportion of unreacted $SO_2$ and carbonyl compound, whereas an increase in $SO_2$ pressure shifts the equilibrium toward the production of the sulfonic acid.

SUMMARY OF THE INVENTION

The present invention relates to an improvement in a well treating process in which fluid is flowed into contact with acidifiable materials in and around a well within a subterranean formation in order to contact those materials with a strong acid. The improvement is effected by flowing fluid into and out of contact with the acidifiable materials with the composition of the fluid arranged so that while contacting those materials, the fluid consists essentially of an aqueous acidic solution containing water, $SO_2$, and at least one carbonyl compound in equilibrium with reactively formed alpha-hydroxysulfonic acid. The kind and amount of the carbonyl compound and the pressure on the solution during its contact with the acidifiable materials are correlated with (a) the temperature of the materials being contacted, (b) the rate at which those materials react with a strong acid at that temperature and (c) the rate at which the contacting fluid is flowed into and out of contact with those materials, so that a selected volume of the reactant-containing fluid is capable of contacting a stoicometric excess of those materials without becoming depleted of hydroxysulfonic acid.

DESCRIPTION OF THE INVENTION

In general, the fluid being flowed into contact with the acidifiable materials can contain the respective reactive components in separate portions and/or separate phases as long as the acidifiable materials are contacted with an acidic aqueous solution containing $SO_2$ and carbonyl compound in equilibrium with hydroxysulfonic acid. In addition, some or all of such fluid can include a salt of hydrofluoric acid so that the solution in contact with the acid reactive materials contains hydrofluoric acid as well as the hydroxy sulfonic acid.

Since $SO_2$ and water form only a weak sulfurous acid the acid soluble material contacted in accordance with the present process is contacted with a strong acid only at the time, and to the extent, that hydroxysulfonic acid is present in the solution contacting them. In such a solution, an increase in pressure increases the proportion of the hydroxysulfonic acid in equilibrium with the $SO_2$ and carbonyl compound.

The rate of the hydroxysulfonic acid formation and the water solubility of the so-formed sulfonic acid tend to decrease with increases in the number of carbon atoms in carbonyl compounds free of polar substituents. For example, if the carbonyl compound is formaldehyde, the rate at which the hydroxysulfonic acid is formed is significantly greater than if the carbonyl compound is, for example, acetone, or a higher ketone or aldehyde. Thus, when an acidifiable material reacts with hydroxysulfonic acid formed from, for example, acetone, the rate at which more sulfonic acid is formed (to replace that utilized in the acidifying reaction and thus maintain the equilibrium) is significantly slower than the rate at which a hydroxysulfonic acid is formed by the reaction of $SO_2$ and water with formaldehyde. The relatively slow replacement of the sulfonic acid results in a relatively slow acidification of the acid reacting material.

On the other hand, if the carbonyl compound employed is relatively polar, for example, hexafluoroacetone, the strength of the resulting alpha-hydroxyperfluoropropanesulfonic acid exceeds that of the analogous alpha-hydroxypropanesulfonic acid made from acetone. Such a stronger acid is capable of reacting more rapidly and complete)y with a less readily acidizable material at a given temperature.

In general, the carbonyl compound employed in the present process can be substantially any compound which contains at least one aldehyde or ketone functional group or a precursor of such a group in a carbonyl compound which is significantly soluble in water and is reactive with $SO_2$ and water to form an alpha-hydroxysulfonic acid. Relatively long chain, polar substituent-free carbonyl compounds exhibit increased solubilities in oil-phase solutions and may be particularly useful in dissolving acid-soluble materials in and around wells containing significant proportions of oil. In addition, if a relatively viscous solution is desired, a water-viscosifying carbonyl compound, such as sucrose, can be employed to form the hydroxysulfonic acid. In general, the carbonyl compound can be injected as a substantially pure liquid or vapor, or in the form of an aqueous solution of such a compound or a precursor, such as paraformaldehyde, a polyoxymethylene, paraldehyde, aldol, etc. In general, the amount of the carbonyl compound should be at least about 5 percent of the stoicometric equivalent of the amount of $SO_2$ to be used. Where the carbonyl compound is injected as an aqueous solution, the concentration of carbonyl compound is preferably at least about 1 percent of that solution.

The present invention is particularly useful in well cleanout operations in which oil in and around the well impedes the contact between the acidizable materials and an aqueous strong acid. In such operations, according to the present process, a carbonyl compound is preferably flowed into the well in the form of a liquid having a volume sufficient to dissolve and/or penetrate into a significant amount of oil. Lower molecular weight ketones such as acetone or, preferably, methyl isobutyl ketone are particularly useful in such operations.

The $SO_2$ can be injected along with ahead of, or after, the carbonyl compound and can be injected as a liquid, gas, or aqueous solution. When injected as an aqueous solution, such solution can be ormed by dissolving $SO_2$ and/or a water soluble sulfite compound in an aqueous liquid. When the $SO_2$ is injected as an aqeous liquid solution the concentration of $SO_2$ is preferably at least about 1 percent of that solution.

In a particularly preferred procedure for acidizing a significant amount of acid reactive material at a significant distance within a subterranean reservoir around the well, the reactants are preferably injected in the form of a mixture of water, $SO_2$ and carbonyl compound at a pressure at least substantially equalling the fluid pressure in the reservoir formation. And, the kind and amount of the carbonyl compound is selected to be relatively slowly reactive to form the hydroxysulfonic acid at the temperature of the reservoir.

The aqueous liquid used in the present process can be substantially any water solution of monovalent salts which is compatible with the water in the reservoir around the well to be treated. The use of water produced from the reservoir formation containing the well is particularly preferred. In general, the pH of the water aqueous solution when it contacts the acidifiable materials should be less than about 1.

EXAMPLE I - MULTIVALENT ION DISSOLVING CAPABILITY

In a 250-ml round-bottom flask equipped with a fritted gas inlet, a gas outlet and a stirrer, were placed 32.7 g of 37% formalin solution (0.4 mole of formaldehyde in water), 80 ml of water and 100 ml of a Mississippi crude oil. To the cold mixture was added 13.6 g (0.21 mole) of sulfur dioxide. The stirred mixture was warmed to 140°–150° F. (a typical well temperature). After 30 minutes, 2.4 g (0.06 moles) of magnesium oxide particles were added and the mixture stirred for an additional 20 minutes. All of the magnesium oxide slurried in the water/oil mixture was dissolved. Upon standing without stirring, the oil and water phases separated and no solid inorganic material remained. Additional magnesium oxide (1.2 g, 0.03 moles) was added and it also dissolved in the aqueous acid phase leaving the Mississippi crude oil free of inorganic material.

EXAMPLE II - ESSENTIALITY OF CARBONYL COMPOUND

The above experiment was repeated, except water was substituted for the formaldehyde solution. In this instance, the sulfur dioxide was ineffective in removing the inorganic material, namely magnesium oxide, from the oil and water mixture. Most of the magnesium oxide remained.

What is claimed is:

1. In a well treating process in which fluid is injected into a well and flowed into contact with acidifiable material in and around a portion of the well within a subterranean earth formation in order to contact the acidifiable material with at least one strong acid, an improved process for controlling the rate of the acidification reaction comprising:

flowing fluid inclusive of water, $SO_2$ and carbonyl compound into the well and into and out of contact with the acidifiable material with the composition of the fluid arranged so that, in contact with the acidifiable material, the fluid consists essentially of an acidic solution of water, $SO_2$ and carbonyl compound in equilibrium with at least one reactively formed alpha-hydroxysulfonic acid; and correlating the kind and amount of the carbonyl compound and the pressure on the fluid which contacts the acidifiable material with respect to (a) the temperature at which that material is contacted (b) the rate at which that material reacts with strong acid at that temperature and (c) the rate at which that fluid is flowed into and out of contact with that material, so that a selected volume of the fluid is capable of being flowed into and out of contact with a stoicometric excess of the acidifiable material without causing a substantially complete depletion of the hydroxysulfonic acid content of the fluid.

2. The process of claim 1 in which said fluid includes an aqueous solution of fluoride salt.

3. The process of claim 1 in which an aqueous solution of carbonyl compound is injected ahead of the $SO_2$.

4. The process of claim 1 in which the concentration of carbonyl compound and injection pressure are arranged so that enough of said fluid is inflowed to permeate the reservoir around the well within a radius of about 1 to 10 feet from the well.

5. The process of claim 1 in which the carbonyl compound is a lower molecular weight ketone in the form of a liquid which is substantially miscible with the reservoir oil.

6. The process of claim 5 in which the carbonyl compound is methyl isobutyl ketone and is injected ahead of the $SO_2$ and water.

7. The process of claim 5 in which the carbonyl compound-containing injected fluid includes alternating slugs of $SO_2$, aqueous liquid and a ketone comprising methyl isobutyl ketone.

* * * * *